E. R. DRAVER.
DISK WHEEL.
APPLICATION FILED OCT. 4, 1920.
1,417,233.
Patented May 23, 1922.
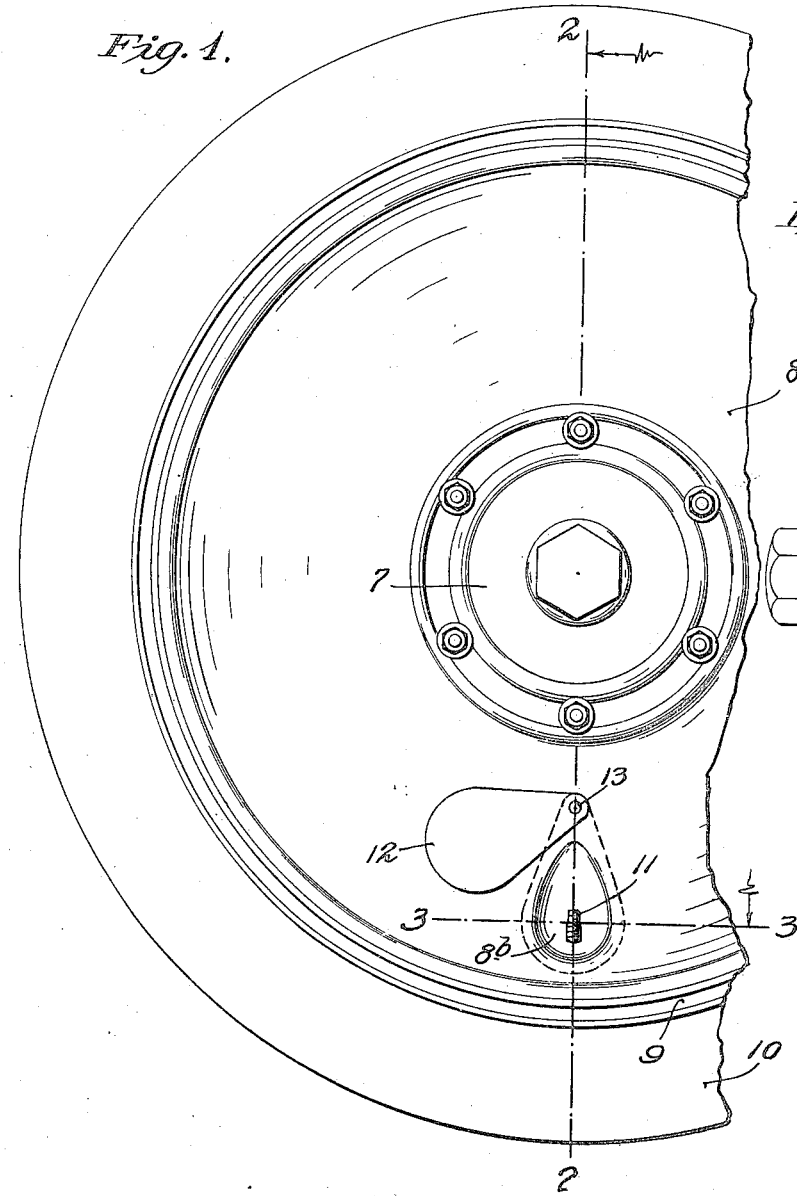
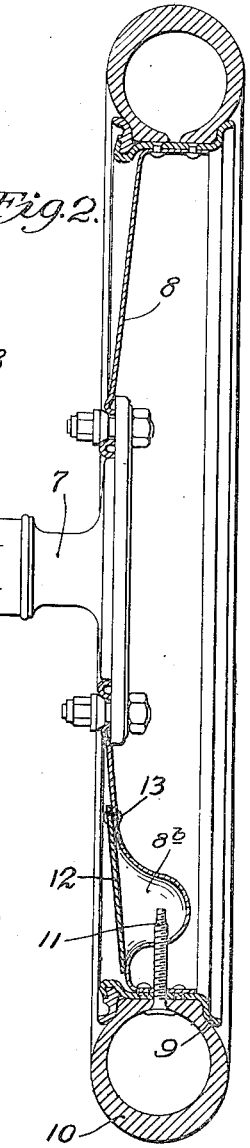
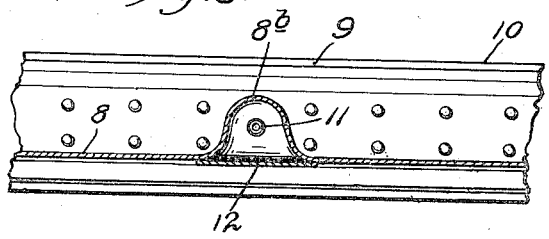
Inventor
E. R. Draver
By his Attorney
Harry D. Kilgore

UNITED STATES PATENT OFFICE.

EMIL R. DRAVER, OF RICHMOND, INDIANA.

DISK WHEEL.

1,417,233.  Specification of Letters Patent.  Patented May 23, 1922.

Application filed October 4, 1920. Serial No. 414,552.

*To all whom it may concern:*

Be it known that I, EMIL R. DRAVER, a citizen of the United States, residing at Richmond, in the State of Indiana, have invented certain new and useful Improvements in Disk Wheels; and I do hereby declare the following to be a full, clear, and exact description of the invention, such as will enable others skilled in the art to which it appertains to make and use the same.

My invention relates to disk wheels, such as are equipped with pneumatic tires and are used on automobiles, trucks and other motor-propelled vehicles.

Wheels of this character have the valve stems of the pneumatic tires located at the inner sides of the wheel disks where they are hard to reach, and where it is very difficult, first, to locate the valve stem, and, second, to connect the air charging tube thereto.

My present invention consists in providing the wheel disk with an inwardly bulged pocket, into which the valve stem is projected so that it may be reached from the outer side of the wheel and the air charging tube readily applied thereto.

The invention is illustrated in the accompanying drawing wherein like characters indicate like parts throughout the several views.

Referring to the drawings:

Fig. 1 is a side elevation with some parts broken away, showing a disk wheel embodying my invention;

Fig. 2 is a section on the line 2—2 of Fig. 1; and

Fig. 3 is a fragmentary section on the line 3—3 of Fig. 1.

The numeral 7 indicates the wheel hub, 8 the wheel disk, 9 the wheel rim and 10 a pneumatic tire having the customary valve stem 11 projected inward through a hole or passage in the rim 9 and in the outer flange of the disk 8. The rim 9 is rigidly secured to the outer flange of the disk 8 in the usual or any suitable way.

My invention is especially directed to disk wheels having single disks, but is not necessarily limited to that type of wheel. The valve stem occupies a position on the inner side of the body or plane of the disk 8, where it is difficult to reach the same from the inner side of the wheel, for the purpose of applying an air charging tube thereto.

In accordance with my invention, the disk 8 is provided with an inwardly bulged pocket $8^b$ into which the inner end of the valve stem 11 is projected. Otherwise stated, the valve stem passes through the inwardly bulged pocket-forming portion of the disk before it enters said pocket. This exposes the end of the valve stem so that an air charging tube may be coupled thereto from the outer side of the wheel and, moreover, the valve stem is given a bearing or support both in the wheel rim and in the pocket, so that it will always be held in a true radial position in respect to the axis of the wheel. It is also evident that, in this arrangement, the wheel disk is formed continuous or of unbroken form at the place where it joins the wheel rim.

The pocket $8^b$ is adapted to be normally closed by a pocket cover 12, shown as pivoted at the disk at 13. This cover may be under light spring tension to spring slightly into the flaring mouth of the pocket when aligned therewith so that it will not be accidentally moved from its pocket closing position. When the pocket $8^b$ is closed by the cover 12 dirt can not get into said pocket and hence the valve stem is kept clean, and, moreover, the presence of the pocket in the disk is obscured so that the disk will have a normal appearance except when closely inspected. The term or expression "pocket," as used in this specification and in the claims, is intended to include or describe a recess or depression formed in the body of the disk inward of the wheel rim and which does not alter the normal plane of the disk nor change the normal form of the disk, except at the small area where the pocket is formed.

What I claim is:

1. A disk wheel having a rim adapted to be equipped with a pneumatic tire and having a radial valve stem passage located on the inner side of the wheel disk, said wheel disk having an inwardly bulged pocket with a valve stem passage therein aligned with the valve stem passage in said rim, whereby the valve stem of an applied tire may be projected into said pocket where access may be had thereto from the outer side of the wheel.

2. A disk wheel provided with a rim equipped with a pneumatic tire, the wheel disk having an inwardly bulged pocket, and said tire having a valve stem passed radially through said wheel rim at the inner side of the disk and into said pocket, thereby exposing the end of said valve stem so that it may be reached from the outer side of the wheel.

3. A disk wheel having a rim and in its disk, radially inward of said rim, having a pocket extended laterally thereof, in combination with a tire having a valve stem extended through said rim and into said pocket, and a pocket cover pivotally attached to the disk and movable to and from alignment with said pocket and having a movement slightly into said pocket.

In testimony whereof I affix my signature.

EMIL R. DRAVER.